(12) United States Patent
Zhang et al.

(10) Patent No.: US 9,124,496 B2
(45) Date of Patent: Sep. 1, 2015

(54) SYSTEM AND METHOD FOR END- OR SERVICE-NODE PLACEMENT OPTIMIZATION

(75) Inventors: Yueping Zhang, Princeton, NJ (US); Zhenyu Wu, Williamsburg, VA (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 379 days.

(21) Appl. No.: 13/444,323

(22) Filed: Apr. 11, 2012

(65) Prior Publication Data

US 2012/0265868 A1      Oct. 18, 2012

Related U.S. Application Data

(60) Provisional application No. 61/474,802, filed on Apr. 13, 2011.

(51) Int. Cl.
  *H04L 12/24*      (2006.01)
(52) U.S. Cl.
  CPC .................................. *H04L 41/0833* (2013.01)
(58) Field of Classification Search
  CPC .......................... H04L 43/062; H04L 41/0833
  See application file for complete search history.

(56) References Cited

U.S. PATENT DOCUMENTS

| | | | | |
|---|---|---|---|---|
| 2003/0033394 | A1* | 2/2003 | Stine | 709/222 |
| 2007/0073897 | A1* | 3/2007 | Sharifzadeh et al. | 709/238 |
| 2008/0229415 | A1* | 9/2008 | Kapoor et al. | 726/22 |

* cited by examiner

*Primary Examiner* — Vivek Srivastava
*Assistant Examiner* — Hien Doan
(74) *Attorney, Agent, or Firm* — Joseph Kolodka (57) ABSTRACT

A method for producing a set of optimized node placement solutions for plural nodes of a computer network includes temporarily relocating movable ones of the nodes in the network; for each temporarily relocated movable node, determining a thermal energy of the network resulting from its temporary relocation in the network; for each temporarily relocated movable node, determining a potential energy reduction in the network resulting from its temporary relocation in the network; for each temporarily relocated movable node, determining whether to accept or reject its temporary relocation in the network; accepting the temporary relocation if an acceptance probability is greater than a randomly generated number, the acceptance probability being a function of the potential energy reduction in the network; and repeating the aforementioned steps to generate a set of optimized node placement solutions.

8 Claims, 7 Drawing Sheets

SYSTEM AND METHOD FOR END- OR SERVICE-NODE PLACEMENT OPTIMIZATION

RELATED APPLICATION

This application claims the benefit of U.S. Provisional Application No. 61/474,802, filed Apr. 13, 2011, the entire disclosure of which is incorporated herein by reference.

FIELD

The present disclosure relates to autonomic computing systems. More particularly, the present disclosure relates to a system and method for providing plural, optimized end- or service-node placement solutions.

BACKGROUND

Today's data center networks (DCN) are continuously evolving because of two major factors: (1) architectural upgrade, such as network topology expansion and new server deployment, driven by increasing application demand; and (2) the dynamics introduced by services running on the top, like traffic patterns changes and application evolutions. This is especially the case in cloud environments with virtualized infrastructures, where users continuously join and leave the system and client instances (i.e., virtual machines) are dynamically created and terminated. Driven by this trend, highly scalable and efficient DCN architectures have been developed.

Some of these DCN architectures have achieved high-bandwidth all-to-all connectivity (or 1:1 over-subscription), appealing scalability, ideal agility, and desirable topology flexibility. However, these architectures require fundamental changes in today's network architectures and/or modifications of hardware equipment, and therefore, encounter non-trivial deployment barriers and may require time to be widely adopted. In contrast, another class of architectures, such as TVMPP (Traffic-aware VM Placement Problem), CPA (Coupled Placement Advisor), and RAP (Resource Allocation Problem), maintain the existing network architecture and routing protocol, but instead, aim at reducing network bandwidth demand by optimizing placement of end-nodes, which can be physical or virtual machines.

Figure 1:
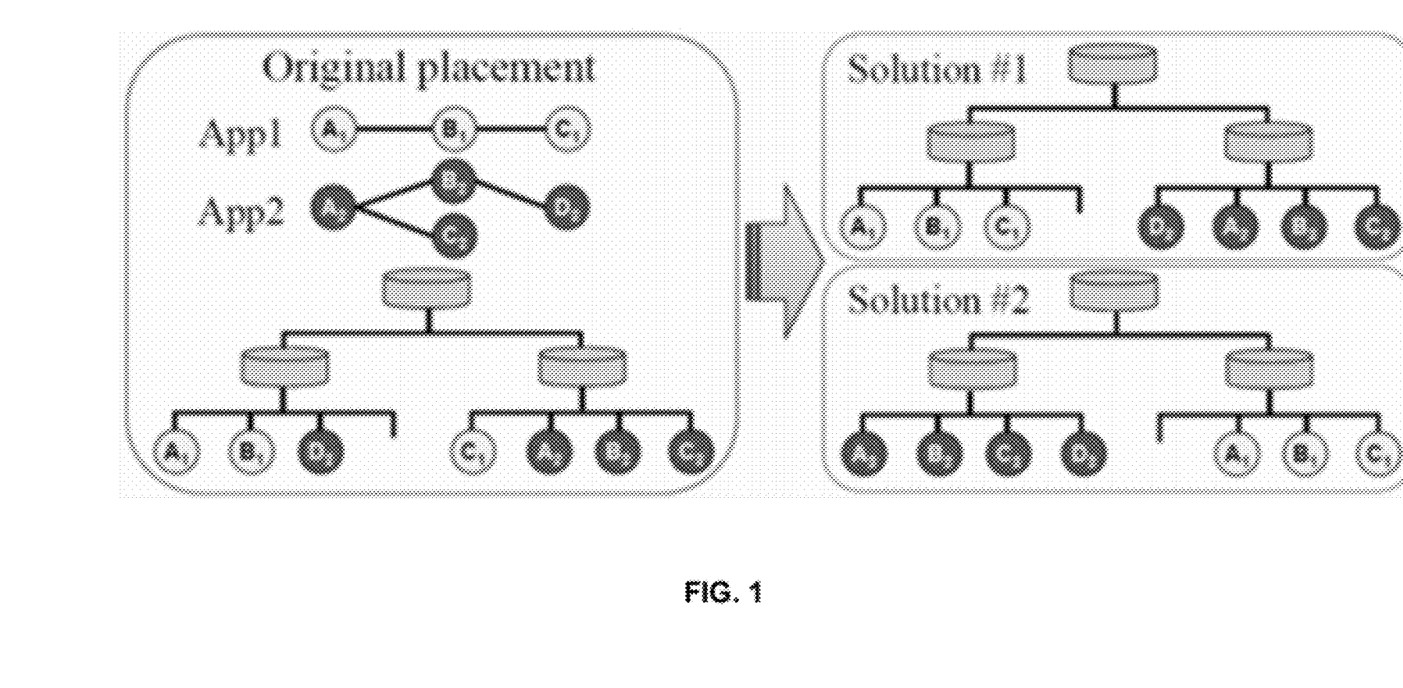
FIG. 1 is a diagram demonstrating two equivalent placement solutions with different transition costs.

The aforementioned placement optimization approaches are capable of generating a single solution that is considered optimal, however, optimal solutions are generally not unique. In modern data centers or enterprise networks, where homogeneous computing and network resources are widely deployed, it is very common that a large number of equally-optimal solutions exist. However, the transition cost from a current configuration to one of these target configuration is significantly different. To better understand this, consider FIG. 1 as a simplistic example. In FIG. 1, two applications App1 and App2 are deployed in a two-level tree network. Clearly, the initial placement (left) of the two applications is sub-optimal, since traffic between ($B_1$, $C_1$) and ($B_2$, $D_2$) has to cross subnets. Two equally-optimal solutions are given on the right, in both of which components belonging to the same application are placed in the same subnet, thereby eliminating inter-subnet traffic. The cost, however, of transition from the initial to the target placement defined by the two solutions is significantly different. Specifically, solution 1 involves only two virtual machine (VM) migrations (i.e., $D_2$ and $C_1$), while solution 2 requires five VM migrations. Besides optimality, DCN operators are also concerned with practical factors including, without limitation, cost, time, and administrative considerations.

Accordingly, a method and system are needed for allowing DCN operators to select a reasonable placement solution from a plurality of placement solutions based on their preferences.

SUMMARY

Disclosed herein is a method for producing a set of optimized node placement solutions for plural nodes of a computer network. The method comprises the steps of: a) temporarily relocating movable ones of the nodes in the network; b) for each temporarily relocated movable node, determining a thermal energy of the network resulting from its temporary relocation in the network; c) for each temporarily relocated movable node, determining a potential energy reduction in the network resulting from its temporary relocation in the network; d) for each temporarily relocated movable node, determining whether to accept or reject its temporary relocation in the network; e) accepting the temporary relocation if an acceptance probability is greater than a randomly generated number, the acceptance probability being a function of the potential energy reduction in the network; and f) repeating steps a-e to generate a set of optimized node placement solutions.

DETAILED DESCRIPTION

The present disclosure provides a DCN end- or service-node placement optimization system and method that includes incremental optimization and exploratory properties. The end- or service-nodes may comprise physical machines (e.g., a computer) and/or virtual machines (e.g. software implementations of physical machines which execute programs like physical machines).

The incremental property relates to how a data center is operated. A data center is a centralized, large-scale computation, storage and communication facility, hosing a large number of services and applications for many customers (internal or external). The number of customers, hosted applications, and the volume of service demands gradually change over time, and thus it is necessary to periodically perform maintenance to optimize the data center resources and meet performance expectations. Due to the massive and complex infrastructure, it is very difficult, if not impossible to conduct global changes in a data center. Consequently, the solution that achieves the best possible optimization may not always be desirable, because it may be infeasible to apply. The node placement optimization system and method of the present disclosure takes maintenance feasibility into account, performs incremental optimization based on existing placement, and identifies less optimal but more feasible solutions rather than a single "best" one.

The exploratory property relates to the additional degrees of freedom that exist in real-world data center management compared with mathematical problem solving. In a theoretical problem, constraints are immutable and must be satisfied, otherwise the solution is invalid. However, in the real-world, constraints are not completely rigid, they can be flexible to a certain extent to accommodate some alternative solutions. For example, in addition to re-arranging the service node placement, the data center operator may also have budget to opt for other options such as upgrading server or network capacity. This opens up many questions that cannot be answered by a single best solution, e.g., which set of servers/edge switches to upgrade, or what are the new capacities. To answer these questions, the node placement optimization system and method of the present disclosure acknowledges the extended flexibility and explores these new degrees of freedom in a controlled manner, and reports worth-while findings.

The DCN node placement optimization system and method according to the present disclosure may be based on swarm intelligence (SI) based metaheuristic methods, i.e., where optimizations are performed iteratively by gradually improving a candidate placement solution, with virtually no assumption about the initial configuration. As a consequence, the incremental property is implicit, i.e., existing service node placement in a data center can be incrementally optimized, and a set of feasible node placement solutions can be obtained. Because most SI methods are stochastic, i.e., the search space is explored in a randomized fashion, the node placement optimization system and method of the present disclosure has the exploratory property described earlier because it reflects the constraint flexibilities as scaling of the search space. Because the node placement optimization system and method is not controlled by deterministic rules, the extended search space may be explored unbiasedly, and the prominent alternative solutions can be discovered.

The system and method of the present disclosure (referred to hereinafter as NetDEO system and method) may use a modified simulated annealing (SA) algorithm running on a pseudo-physical system and may be independent of the underlying network topology. The NetDEO system and method incrementally optimizes existing node placement and generates a set of placement solutions with a wide range of optimality and corresponding costs. More specifically, the NetDEO system and method provides a wide selection of alternative placement optimization solutions with different benefit-cost characteristics as well as efficient network and server system upgrade suggestions, which enable the DCN operators to easily customize placement optimization plans according to their budget.

The NetDEO system and method may iteratively perform randomized exploration of (1, 2)-displacement neighborhood configurations (i.e., configurations that require only one or two VM moves or migrations to reach), and probabilistically accepts the new configuration. The probability of accepting a configuration may be derived from two factors: the improvement of objective function and DCN system thermal energy.

Thermal energy may be used to control the greediness of the system and method. Conceptually similar to temperature in SA algorithms, thermal energy is inversely correlated with the greediness of the system and method. In addition, like temperature, thermal energy in the present system and method also gradually decreases as the iteration progresses, allowing the DCN system to converge to a low potential energy state.

In prior art SA algorithms, greediness only applies to degraded configurations, that is, improved configurations are always accepted but degraded ones are accepted with a probability correlated to the temperature. The NetDEO system and method of the present disclosure extends the greediness control to improved configurations as well. In particular, the system and method may always prefer improved configurations to degraded ones, and the more improvement, the higher the preference. The higher the thermal energy, the higher probability the system and method accepts an inferior configuration.

Also, in prior art SA algorithms, the thermal energy is controlled by a deterministic cooling schedule. In contrast, the NetDEO system and method of the present disclosure associates thermal energy with DCN system potential energy. The NetDEO system and method performs energy conversion and energy dissipation. To perform energy conversion, a "free energy pool," may be generated which complements the change of the system potential energy during the iterative optimization process. Then, for each iteration, the system and method causes the energy pool to gradually release its energy and converts the released amount into thermal energy. Meanwhile, for each iteration with accepted movement, the system and method defines an amount of the thermal energy that will dissipate. The amount of energy of the conversion and dissipation is correlated with the amount of "free energy" and thermal energy, respectively.

The energy conversion and dissipation process functions as a proportional feedback mechanism for providing the greediness control process of the system and method with proportional feedback from the optimization process, and allows the system and method to self-regulate the cooling process and to promote faster convergence. When the system and method makes continuous "down-hill" node moves, quickly lowering potential energy, the released potential energy is accumulated as "free energy," which gradually increases the system and method's thermal energy, preventing the system and method from being too greedy and falling into local minimum traps. However, when the system and method is (inevitably) trapped in a local minima and cannot make more node moves, thermal dissipation stops and thermal energy raises quickly due to the "free energy" conversion. The increased thermal energy reduces system and method greediness and causes the system and method to make "up-hill node moves. And as soon as the method escapes the local minima trap, the increased thermal energy quickly dissipates, thereby preventing the system and method from diverging.

Figure 2:
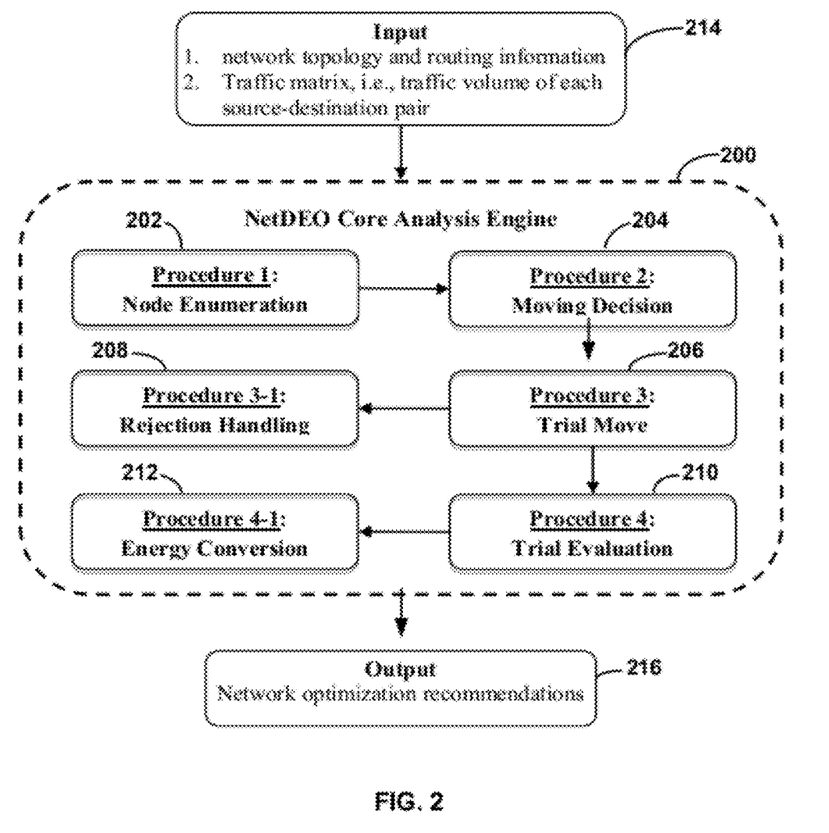
FIG. 2 is a block diagram of a system according to an exemplary embodiment of the present disclosure.

FIG. 2 is a block diagram of the system according to an exemplary embodiment of the present disclosure. The system comprises an NetDEO core analysis engine 200 having an input 214 for receiving network topology and routing information and a traffix matrix (i.e., traffic volume of each source-destination node pair), and an output 216 for providing a set network optimization recommendations. The NetDEO core analysis engine 200 includes a node enumeration module 202, a moving decision module 204, a trial move module 206, a rejection handling module 208, a trial evaluation module 210, and a energy conversion module 212.

Figure 3:
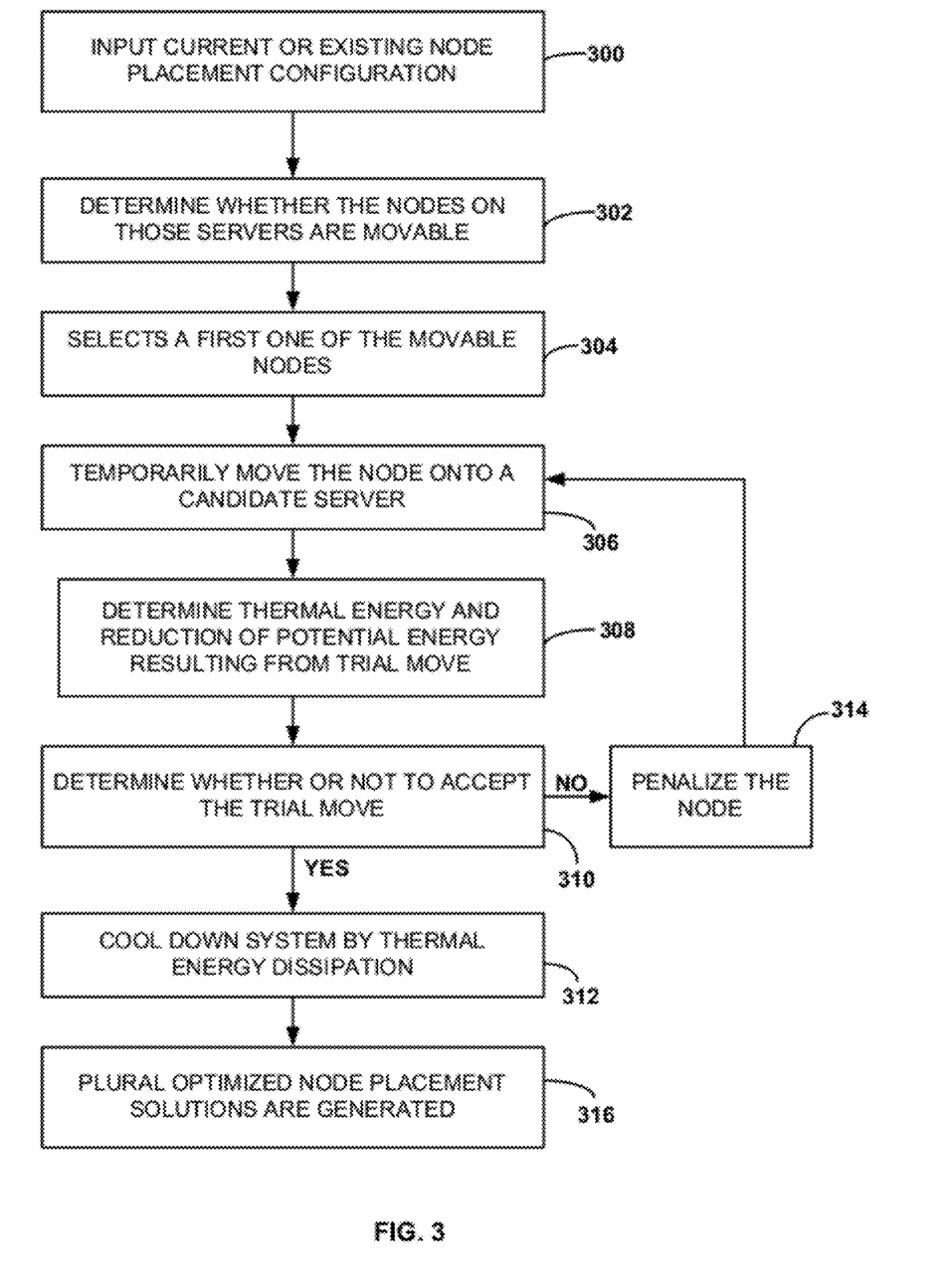
FIG. 3 is a flow chart of a method performed by the system shown in FIG. 2, according to an exemplary embodiment of the present disclosure.

FIG. 3 is a flow chart of the method performed by the system shown in FIG. 2, according to an exemplary embodiment of the present disclosure. The method may commence in box 300 with the input of the current or existing node placement configuration into the NetDEO core system analysis engine, which assumes that all nodes must be deployed. If there are un-deployed nodes, such as new service nodes to be deployed, they may be "virtually" deployed in an optionally performed pre-processing procedure. The pre-processing procedure may comprise a greedy best fit process or a randomized node placement process.

Figure 4:
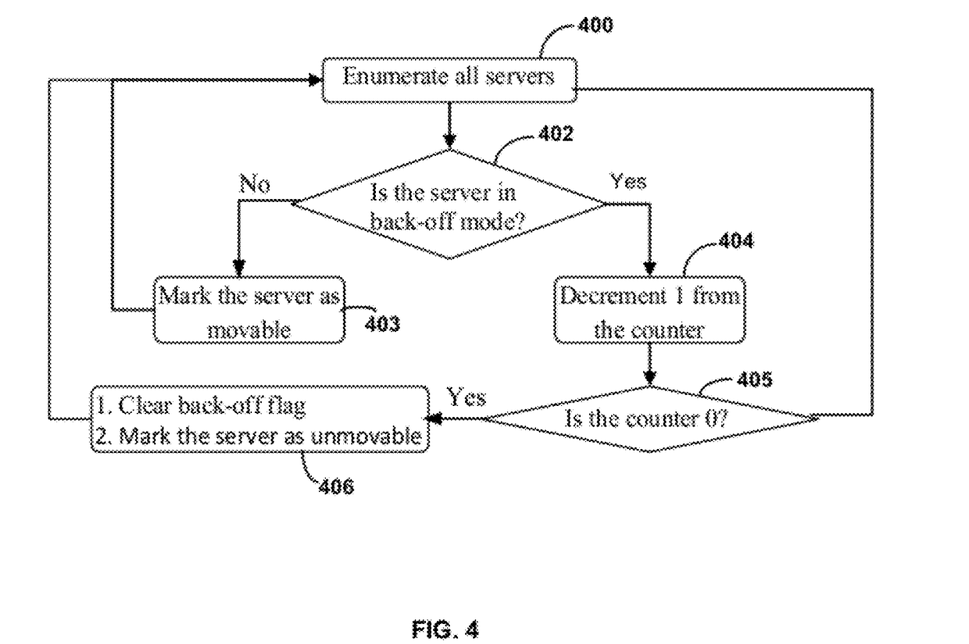
FIG. 4 is a flow chart depicting the operation of a node enumeration module according to an exemplary embodiment of the present disclosure.

In box 302, the node enumeration module of the NetDEO engine scans all servers (e.g., computers, edge switches, and combinations thereof) in the data center network to determine whether the nodes (e.g., VMs, physical machines, and combinations thereof) on those servers are movable. FIG. 4 is a flow chart depicting the operation of the node enumeration module according to an exemplary embodiment of the present disclosure. In box 400, a first server in the data center network is counted. In box 402, a determination is made as to whether the counted server is in a back-off mode. If the counted server is not found to be in the back-off mode in box 402, the server is marked as movable in box 403 and the logic returns to box 400 where another server in the data center network is counted and the process moves forward again from there for that server. If, however, the counted server is found to be in the back-off mode in box 402, the logic flows to box 404 where a "one" (1) is decremented from a node enumeration module counter. The logic then flows to box 405 where a determination is made as to whether the counter is at zero (0). If the counter is found to be at zero (0) in box 405, the logic flows to box 406 where the back-off flag is cleared and the server is marked as unmovable. The logic then flows back to box 400 where another server in the data center network is counted and the process is repeated for that server. If the counter is not zero in box 405, the logic flows back to box 400 where another server in the data center network is counted and the process is repeated for that server.

Figure 5:
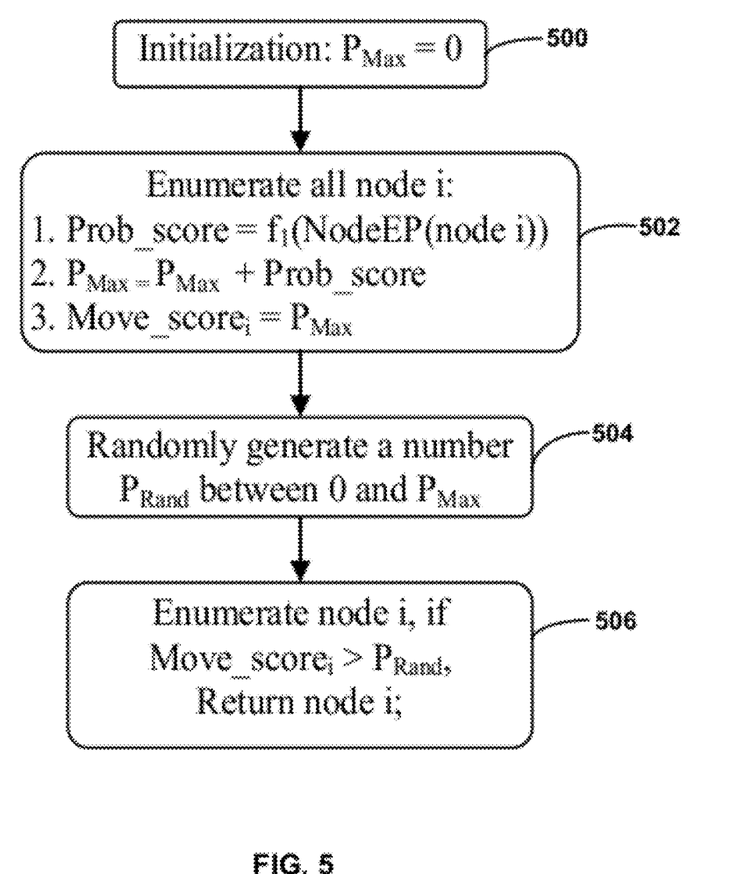
FIG. 5 is a flow chart depicting the operation of a moving decision module according to an exemplary embodiment of the present disclosure.

Referring again to FIG. 3, the logic flows to box 304 where the moving decision module of the NetDEO engine selects a first one of the movable nodes found in box 302. FIG. 5 is a flow chart depicting the operation of the moving decision module according to an exemplary embodiment of the present disclosure. In box 500, the maximum potential energy $P_{max}$ is initially set to zero (0). Then in box 502, all the movable nodes (nodes i) are enumerated by setting a probability score (Prob_score) equal to an activation function of the potential energy of each node ($f_1$(NodeEP(node i))), setting $P_{max}$ equal to $P_{max}$ plus Prob_score, and setting a move score of the node (Move_score$_i$) equal to $P_{max}$. The logic then flows to box 504 where a number is randomly generated ($P_{Rand}$) between zero (0) and $P_{max}$. Then in box 506, node i is enumerated if Move_score$_i$ is greater than $P_{Rand}$.

The activation function $f_1$( ) is used to compress the potential energy of node I from [0, infinity) to [0, 1). In one embodiment, the activation function $f1(x)$ equals a tan $(0.01x)*(pi/2)$. In other embodiments, other functions may be used instead.

The node potential NodeEP($N_i$) may be defined as:

$$NodeEP(N_i) = \sqrt{\sum_{j=0}^{m} TStress(N_i, N_j)^2} m^{-1}$$

where m is the number of nodes that are communicating with node $N_i$ and pair-wise traffic stress TStress($N_i$, $N_j$) is given by:

$$TStress(N_i, N_j) = T_{ij} \times D_{ij} \times D_{ij}^{-1}.$$

Here $T_{ij}$, $D_{ij}$, and $R_{ij}$ respectively denote the traffic rate, path length, and route reliability between nodes i and j.

Referring again to FIG. 3, the logic now flows to box 306 where the trial move module of the NetDEO engine temporarily moves the node selected in box 304 onto a candidate server. In box 308, the trial evaluation module of the NetDEO engine calculates the thermal energy and the reduction of potential energy resulting from the trial move performed in box 306. The resulting thermal energy and reduction of potential energy may be calculated by exploring the 1-displacement neighborhood and determining the improvement in the objective function value (i.e., the reduction of the system potential). In box 310, the trial evaluation module of the NetDEO engine determines whether or not to accept the trial move performed in box 306 based on the resulting thermal energy and objective function value improvement calculated in box 308. If the trial move is accepted on box 310, the logic flows to box 312 where the energy conversion module of the NetDEO engine causes the entire system to cool down by thermal energy dissipation. The amount of thermal energy dissipation or thermal energy loss is calculated as: $\Delta ET = f_2$(ET) where $f_2$ is an activation function. The activation function compresses input values in domain $[-\infty, \infty]$ to positively correlate output values in range $(0, \infty)$. The range of this function may be selected to ensure that the total energy (thermal+potential) of the system keeps reducing, i.e., the system eventually converges.

Figure 6:
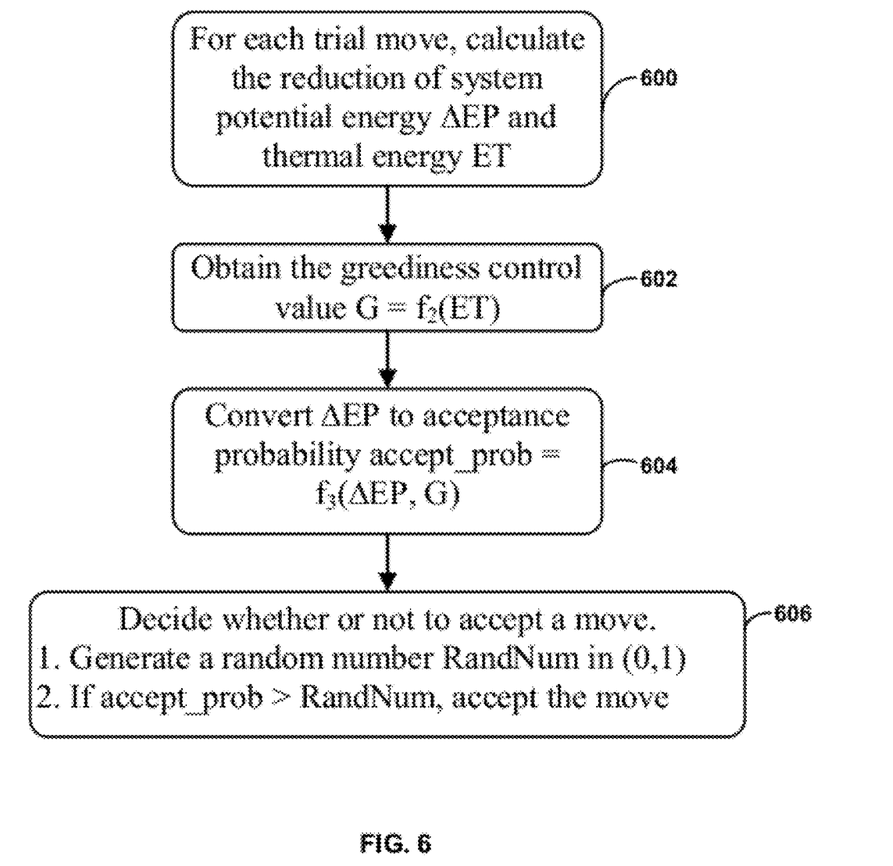
FIG. 6 is a flow chart depicting the operation of the trial evaluation and energy conversion modules according to an exemplary embodiment of the present disclosure.

FIG. 6 is a flow chart depicting the operation of the trial evaluation and energy conversion modules according to an exemplary embodiment of the present disclosure. In box 600, the reduction of system potential energy $\Delta EP$ and thermal energy ET are calculated for each trial move. Then in box 602, a greediness control value $G = f_2$(ET) is obtained, and in box 604 the system potential energy $\Delta EP$ is converted to acceptance probability accept_prob = $f_3(\Delta EP, G)$. In box 606, the determination is made whether to accept a move by generating a random number RandNum in (0,1) and if the acceptance probability is greater than the randomly generated number, accepting the move. The activation function $f_2(x)$ is given by:

$$f_2(x) = \begin{cases} \exp(0.1x + 1) + 1 & x \leq 0 \\ \log(0.1x) & x > 0, \end{cases}$$

and the activation function $f_3(x, G)$ is given by:

$$f_3(x, G) = (1 + \exp(-Gx))^{-1}.$$

Referring again to FIG. 3, if the trial move is not accepted in box 310, the logic flows to box 314 where the rejection handling module of the NetDEO engine may mark or flag the node in the back-off mode, thereby penalizing the node. The penalty or back-off period may be exponentially increased each time the node is consecutively rejected. The logic may then flow back to box 306 where the trial move module of the NetDEO engine temporarily moves the node onto another candidate server and then in box 308, the trial evaluation module of the NetDEO engine calculates the thermal energy and the reduction of potential energy resulting from the trial moved performed in box 306. The resulting thermal energy and reduction of potential energy may be calculated by exploring the 2-displacement neighborhoods (exchanging another node on the candidate server with the original server of moved node) and determining the improvement in the objective function value (i.e., the reduction of the system potential). When the node is finally marked as a successful move, its back-off flag may be cleared and its penalty reset to zero (0).

The above described method of FIG. 3 is applied to all the nodes in the data center, thereby producing a set of iteratively optimized node placement solutions with different optimality and associated transition costs. In box 316, the plurality optimized node placement solutions are generated at the output of the NetDEO engine. A network operator may then select the most suitable one of the solutions based on the operator's own preference and practical considerations.

Figure 7:
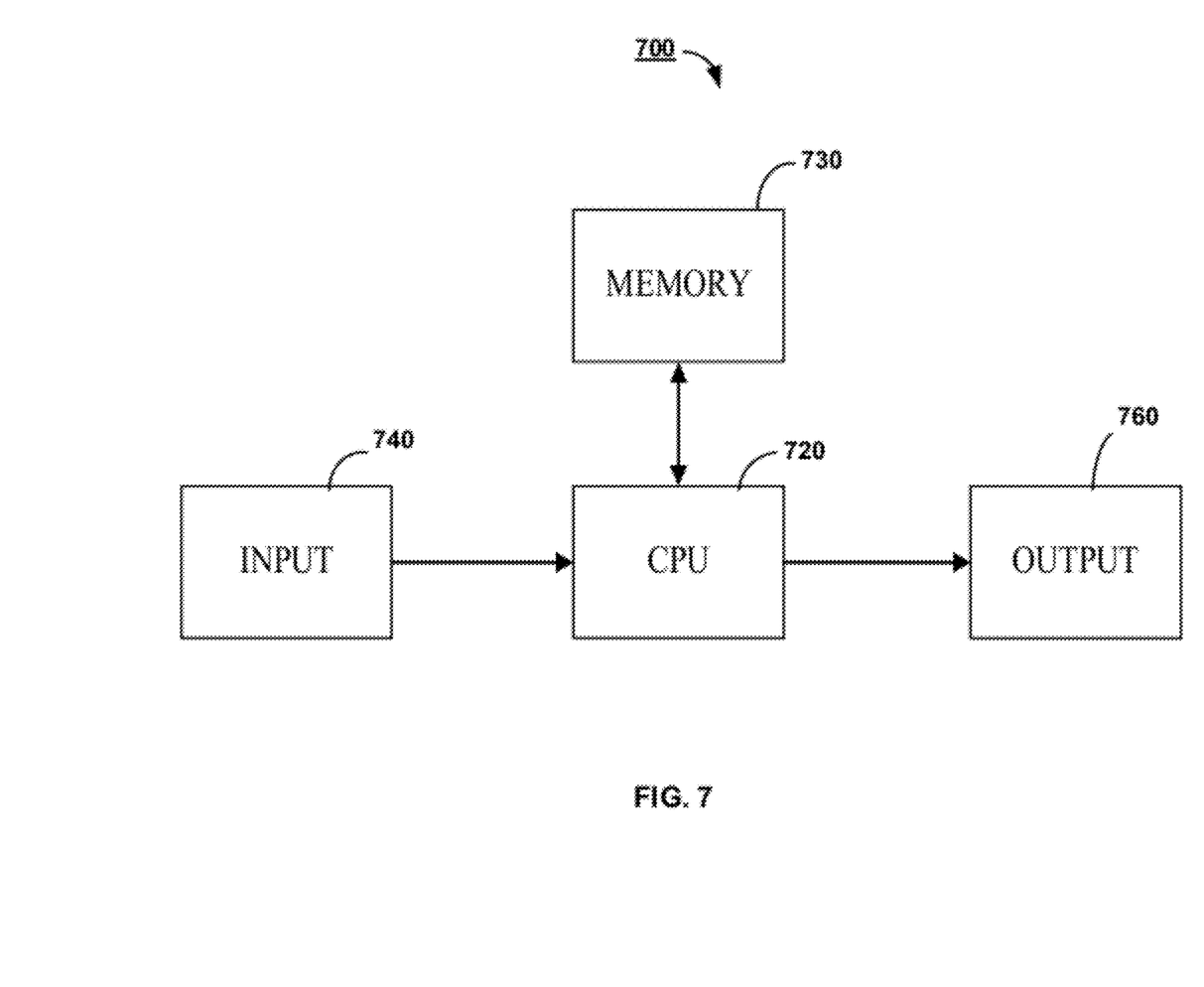
FIG. 7 is a block diagram of an exemplary embodiment of a computer system or apparatus for implementing the system and method of the present disclosure.

FIG. 7 is a block diagram of an exemplary embodiment of a computer system or apparatus 700 that may be used for implementing the system and method described herein. The computer system/apparatus 700 may include at least one CPU 720, at least one memory 730 for storing one or more programs which are executable by the CPU 720 for implementing and performing the system and method described herein, one or more inputs 740 for receiving input data and an output 760 for outputting data.

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A method for producing a set of optimized node placement solutions for plural nodes of a computer network, the method comprising:
 a) temporarily relocating, in a computer process, movable ones of the nodes in the network;
 b) for each temporarily relocated movable node, determining in a computer process, a thermal energy of the network resulting from its temporary relocation in the network, the thermal energy being inversely correlated with greediness of the network;
 c) for each temporarily relocated movable node, determining, in a computer process, a potential energy reduction in the network resulting from its temporary relocation in the network, the potential energy being a function of pair-wise traffic stress;
 d) for each temporarily relocated movable node, determining, in a computer process, whether to accept or reject its temporary relocation in the network;
 e) accepting the temporary relocation in a computer process, if an acceptance probability is greater than a randomly generated number, the acceptance probability being a function of the potential energy reduction in the network; and
 f) repeating steps a) to e) to generate a set of optimized node placement solutions.

2. The method according to claim 1, further comprising:
for each temporarily relocated movable node, allowing the thermal energy resulting from its temporary relocation in the network, to dissipate.

3. The method according to claim 1, further comprising:
rejecting the temporary relocation in a computer process, if the acceptance probability is less than the randomly generated number, prior to step f).

4. The method according to claim 3, further comprising:
applying a penalty to each of the rejected nodes.

5. The method according to claim 4, further comprising:
for each rejected node, temporarily relocating it to a different location in the network, in a computer process and repeating steps b) to d);
accepting the temporary relocation in a computer process, if the acceptance probability is greater than a randomly generated number; and
removing the penalty.

6. The method according to claim 1, further comprising:
determining, in a computer process, which ones of the nodes of the network can be relocated prior to step a), wherein the nodes that are capable of being relocated are the movable nodes.

7. The method according to claim 1, further comprising:
selecting, in a computer process, a first one of the movable nodes to temporarily relocate in the network prior to step a).

8. The method according to claim 7, further comprising:
selecting, in a computer process, a second one of the movable nodes to temporarily relocate in the network prior to step a) and after the temporary relocation of the first one of the movable nodes has been accepted.

* * * * *